United States Patent [19]

Nesselbeck et al.

[11] Patent Number: 5,536,279
[45] Date of Patent: Jul. 16, 1996

[54] METHOD OF COVERING AN ELECTRODE FOR ELECTROCHEMICAL CELLS

[75] Inventors: Neal N. Nesselbeck, Lockport; Joseph E. Spaulding, Tonawanda; Barry C. Muffoletto, Alden, all of N.Y.

[73] Assignee: Wilson Greatbatch Ltd., Clarence, N.Y.

[21] Appl. No.: 406,110

[22] Filed: Mar. 31, 1995

Related U.S. Application Data

[63] Continuation-in-part of Ser. No. 82,235, Jun. 24, 1993, abandoned.

[51] Int. Cl.$^6$ .............................. H01M 6/18; H01M 4/08
[52] U.S. Cl. ........................ 29/623.5; 429/191; 429/213
[58] Field of Search ........................... 29/623.5; 429/191, 429/213

[56] References Cited

U.S. PATENT DOCUMENTS

| | | | |
|---|---|---|---|
| 3,957,533 | 5/1976 | Mend et al. | 136/38 |
| 3,993,501 | 11/1976 | Kalnoki-Kis | 429/48 |
| 4,182,798 | 1/1980 | Skarstad | 429/213 |
| 4,296,185 | 10/1981 | Calanzarite | 429/48 |
| 4,359,818 | 11/1982 | Zayatz | 29/623 |
| 4,398,346 | 8/1983 | Underhill et al. | 29/623 |
| 4,547,439 | 10/1985 | Genies | 429/105 |
| 4,608,322 | 8/1986 | Howard et al. | 429/105 |
| 4,668,596 | 5/1987 | Shacklette et al. | 429/194 |
| 4,687,598 | 8/1987 | Varma | 252/518 |
| 4,772,517 | 9/1988 | Muenstedt et al. | 428/457 |
| 4,801,678 | 1/1989 | Horak et al. | 528/219 |
| 4,803,138 | 2/1989 | Kobayashi et al. | 429/194 |
| 4,812,376 | 3/1989 | Rudolph | 429/191 |
| 4,818,646 | 4/1989 | Takakubo et al. | 429/213 |
| 5,057,387 | 10/1991 | Masuda et al. | 429/194 |
| 5,139,901 | 8/1992 | Kawaguchi et al. | 429/218 |
| 5,151,162 | 9/1992 | Muller et al. | 294/131 |
| 5,209,994 | 5/1993 | Blattenberger et al. | 429/213 |
| 5,458,994 | 10/1995 | Nesselbeck et al. | 429/101 |

OTHER PUBLICATIONS

International Application Published Under the patent Cooperation Treaty WO 92/1060; 25 Jun. 1992; Medtronic, Inc.: Blattenberger et al: Lithium–iodine Electrochemical Cells With Improved End of life Characteristics.

*Primary Examiner*—John S. Maples
*Attorney, Agent, or Firm*—Hodgson, Russ, Andrews, Woods & Goodyear

[57] ABSTRACT

In an alkali metal-halogen or oxyhalide electrochemical cell wherein an alkali metal anode, preferably lithium, has a surface in operative contact with a halogen-containing or oxyhalide cathode/electrolyte including a solvent if necessary, an electrode covering, preferably applied on the anode surface comprising a non-fabric, continuous and solid film of substrate material having a uniform unit weight, is described. The substrate material is perforated to provide for ion flow therethrough and coated with organic electron donor material, or other suitable coating material. The film substrate material preferably comprises a mechanically perforated synthetic polyester film material, and the film is prepared by contacting with a solution of the organic material and solvent followed by drying. The resulting coated film is flexible and is applied to the operative surface of the electrode thereby covering the same, preferably adhered to the surface by pressing. The flexible film can be applied equally well to electrode surfaces which are either smooth and flat or irregular.

37 Claims, 3 Drawing Sheets

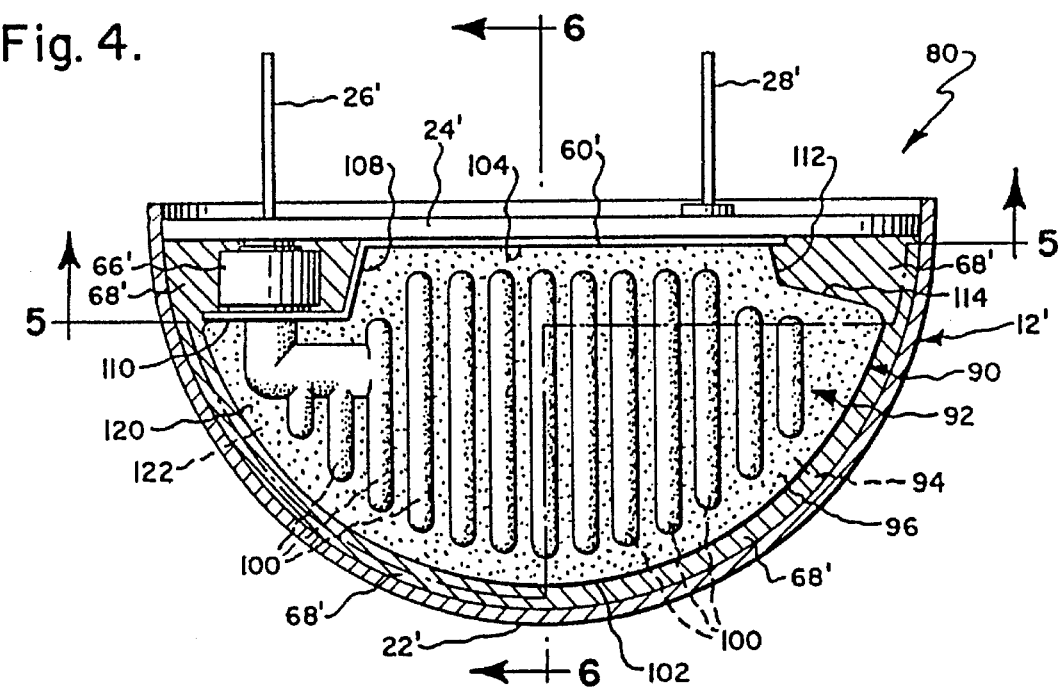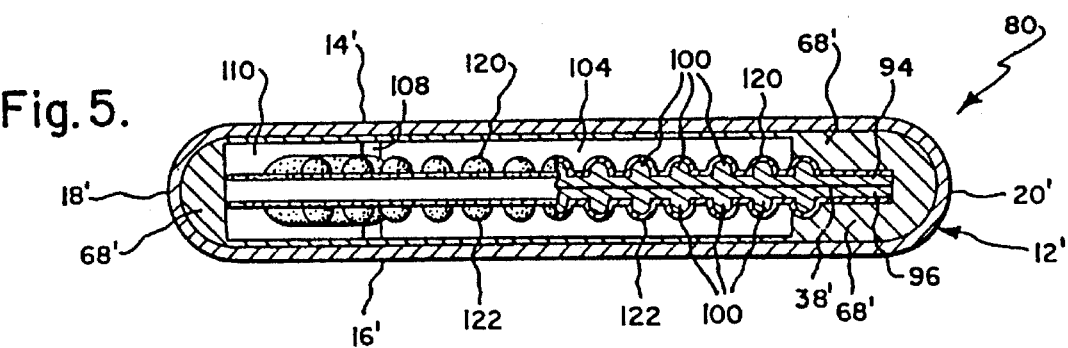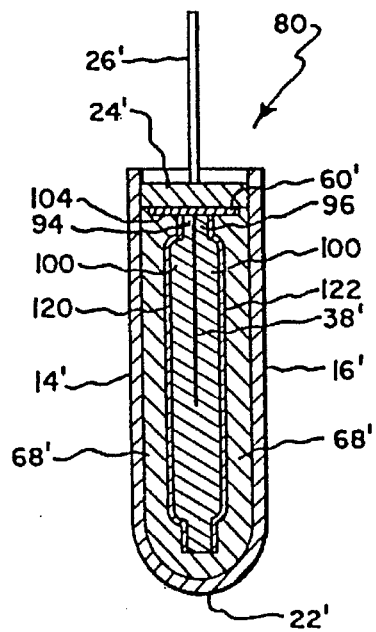

METHOD OF COVERING AN ELECTRODE FOR ELECTROCHEMICAL CELLS

CROSS-REFERENCE TO RELATED APPLICATION

This application is a continuation-in-part of application Ser. No. 08/082,235, filed Jun. 24, 1993, now abandoned.

BACKGROUND OF THE INVENTION

1. Field of the Invention

This invention relates to the art of electrochemical cells, and more particularly to a new and improved electrode covering for alkali metal-halogen and alkali metal-oxyhalide cells.

The recent growth in small-sized electronic devices has required electrochemical cells having high energy density and current delivery capability. As a result of this need, alkali metal-halogen and alkali metal-oxyhalide cells have been developed wherein the anode typically is lithium and the electrolyte in operative contact with the anode and the cathode element is respectively solid or liquid. In the development of such cells it has been found advantageous to coat the operative electrode surfaces, and particularly the anode surface with organic electron donor material. For example, in alkali metal-halogen, solid electrolyte cells, such an electrode covering beneficially results in a greater utilization of the lithium anode and a reduction in cell impedance. In alkali metal-oxyhalide, liquid electrolyte cells, an organic electron donor material electrode covering advantageously inhibits the formation of compounds on the anode surface that otherwise would cause passivation giving rise to a voltage delay after storage at elevated temperatures.

2. Discussion of the Prior Art

The prior art has developed a variety of techniques for applying coatings including painting or brushing a solution of organic electron donor material dissolved in solvent onto the anode surface. Another method comprises forming a sheet of the organic electron donor material such as by hot pressing and then applying the preformed sheet onto the anode surface, often in conjunction with an adhesive. These methods are well known to those of ordinary skill in the art. However, they are often time consuming and do not necessarily result in a uniform layer of organic material being applied to the anode surface.

As a solution, U.S. Pat. No. 4,812,376, issued Mar. 14, 1989 to Rudolph and entitled Anode Coating For Lithium Cell, which is assigned to the assignee of the present invention and is incorporated herein by reference, discloses an improved anode coating for use in an alkali metal-halogen or oxyhalide electrochemical cell comprising a film of synthetic open mesh, non-woven fabric or cloth material having the organic electron donor material impregnated therein. The film is prepared by contacting the non-woven fabric material with a solution of the organic material and solvent, followed by drying. The resulting film is flexible enough to be applied to the operative surface of the anode by pressing, thereby coating the anode. The open mesh, non-woven fabric material used as the substrate can comprise a polyester open mesh material, such as #3251 Hollyrex-Paper polyester. This material works well, but the non-woven and fabric characteristics cause the substrate to vary in its weight per unit area, i.e., large standard deviation, resulting in a non-uniform layer of organic material being contacted with the anode surface. Alternate spin-bonded non-woven or woven fabric substrate materials are known, but they too vary widely in their unit weight.

The present invention thus provides in an alkali metal-halogen or oxyhalide electrochemical cell wherein an alkali metal anode, preferably lithium, has a surface in operative contact with a halogen-containing or oxyhalide cathode/electrolyte including a solvent if necessary, a covering on at least one of the electrodes comprising the cell and more particularly a covering on the anode surface. The present covering is nonfabric and begins as a continuous and solid film of substrate material having a uniform unit weight. The solid film is perforated to provide for ion flow therethrough and coated with organic material, for example organic electron donor material, or other suitable coating material. The perforated film substrate material is flexible, preferably comprising a mechanically perforated synthetic polyester film material, and the film is prepared by contacting the substrate material with a solution of the organic material and solvent, followed by drying. The resulting coated film is flexible and is applied to the operative surface of the electrode preferably by pressing, thereby covering the same. The flexible film can be applied equally well to electrode surfaces which are either smooth and flat or irregular.

OBJECTS OF THE INVENTION

It is, therefore, a primary object of this invention to provide a new and improved electrode covering for alkali metal/halogen or oxyhalide cells and a method of making the same.

It is a further object of this invention to provide such an improved covering in the nature of a preformed film which is applied to the anode surface.

It is another object of this invention to provide such a pre-formed, non-fabric coated film having a uniform thickness or uniform weight per unit area when applied to the electrode surface.

It is a more particular object of this invention to provide such a pre-formed, non-fabric coated film for an electrode covering which has some flexibility.

It is a further object of this invention to provide such a pre-formed, non-fabric coated film for an electrode covering which includes organic electron donor material as the coating and is flexible in nature.

It is still another object of this invention to provide such a pre-formed, non-fabric coated film as an anode covering which is flexible in nature and adheres well to the surface of the metal anode.

Yet a further object of this invention is to provide such a pre-formed, non-fabric coated film comprised of a mechanically perforated film of polymeric substrate material provided with an organic electron donor coating material, wherein the pre-formed film is flexible in nature. A film according to the present invention is of a polymeric material having a thickness less than about 10 mils to as thin as 0.1 mils (0.0001 inches).

It is a further object of this invention to provide such an electrode covering and method that is convenient, effective and economical to practice and that is readily adapted to current manufacturing techniques.

BRIEF DESCRIPTION OF THE DRAWING FIGURES

The above and other objects, features, and advantages of the present invention will be apparent in the following detailed description of the preferred embodiments taken in conjunction with the accompanying drawings, in which:

FIG. 4 is a sectional view similar to FIG. 2 of a cell according to another embodiment of the present invention;

FIG. 5 is a sectional view taken about on line 5—5 in FIG. 4;

FIG. 6 is a sectional view taken about on line 6—6 in FIG. 4; and

DETAILED DESCRIPTION OF THE ILLUSTRATED EMBODIMENTS

Figure 1:
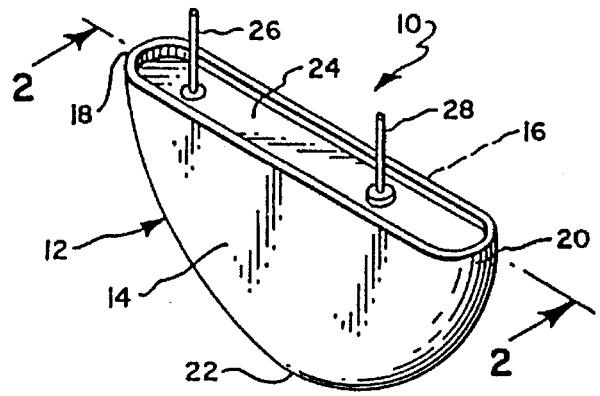
FIG. 1 is a perspective view of an alkali metal-halogen cell having a covered anode according to the present invention.
Figure 2:
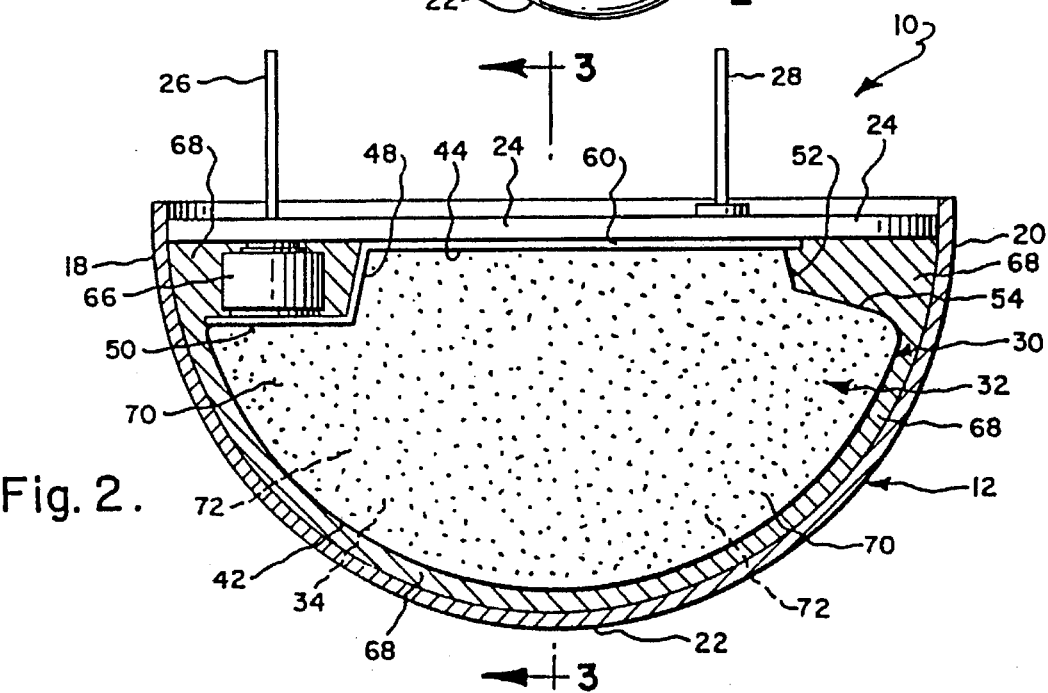
FIG. 2 is an enlarged sectional view taken about on line 2—2 in FIG. 1.
Figure 3:
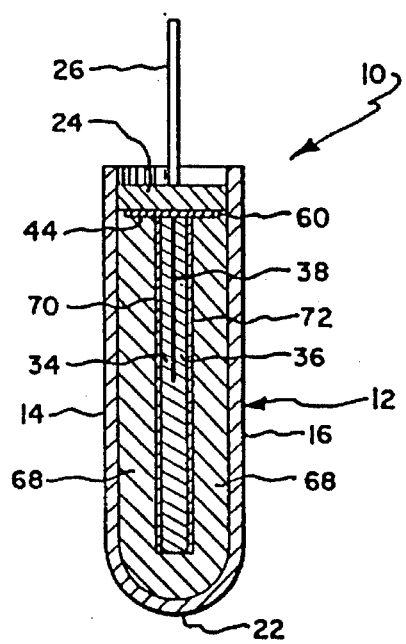
FIG. 3 is a sectional view taken about on line 3—3 in FIG. 2.

Referring now to FIGS. 1–3, there is shown an alkali metal-halogen electrochemical cell 10 including a covered anode according to one embodiment of the present invention. The covered anode and other cell components are contained within a casing 12 of metal, such as stainless steel, including spaced apart side walls 14,16 joined by curved end walls 18,20 and a curved bottom wall 22. The open top of casing 12 is closed by a lid 24 which can be welded to casing 12.

The covered anode of the present invention can be used with alkali metal-halogen, solid electrolyte or alkali metal-oxyhalide, liquid electrolyte electrochemical cells. In the solid electrolyte type, for example, a lithium-halogen cell, halogen-containing material such as a charge transfer complex of an organic electron donor component and halogen, is contained within casing 12 in operative contact with the anode of the present invention and with the sides, bottom and end walls of the conductive metal casing 12, which serves as a cathode current collector. External cell connection is provided by terminal leads 26 and 28 which are operatively connected to the anode and cathode, respectively, of the cell in a manner which will presently be described in detail. For a more detailed description of such a solid electrolyte cell, reference may be made to U.S. Pat. No. 4,401,736 issued Aug. 30, 1983, entitled Anode Assembly For Lithium Halogen Cell and assigned to the assignee of the present invention, the disclosure of which is hereby incorporated by reference.

In the liquid electrolyte system, for example, a lithiumoxyhalide cell, liquid electrolyte fills the casing interior and is in operative contact with the anode and with either the conductive casing serving as a cathode current collector or with a cathode having a current collector embedded therein with a lead extending therefrom to the terminal lead 28. The liquid electrolyte can comprise a liquid organic electron donor material that is in operative contact with both electrodes. A separator is employed between the anode and cathode. For a more detailed description of such a liquid electrolyte cell reference may be made to U.S. Pat. No. 4,246,327 issued Jan. 20, 1981 and entitled High Energy-Density Battery System, to U.S. Pat. No. 4,440,453 issued Aug. 23, 1983 and entitled Non-Aqueous Electrochemical Cell, and to U.S. Pat. No. 4,666,799 issued May 19, 1987 and entitled Current Collectors for Batteries Having Cathode-Electrolytes And Batteries Incorporating Same.

The electrochemical cell 10 includes an anode generally designated 30 according to the present invention and comprising an anode body 32 of alkali metal, preferably lithium. The anode body 32 can comprise a pair of lithium plates 34,36 pressed together and bonded against an anode current collector 38, which is a portion of the anode conductor means of the cell. Current collector 38 thus is sandwiched between plates 34,36 and can be of various forms such as a length of wire, a strand or ribbon, or a mesh or screen. Current collector 38 is of metal such as nickel or nickel alloy. Each of the plates 34,36 in the cell of FIGS. 2 and 3 has generally planar, flat, oppositely directed generally parallel surfaces. The edge or periphery of each plate is shown in FIG. 2. In particular, each plate, for example plate 34 shown in FIG. 2, has a curved edge 42 extending along a major portion of the periphery or border and having a curvature conforming generally to the curvature of the casing bottom wall 22. A relatively straight edge portion 44 also is provided and meets curved edge 42 through step-like portions at each end thereof. In particular, the left hand end of edge 44 meets a relatively short inclined edge portion 48, which, in turn, meets another relatively short edge portion 50 leading to one end of the curved edge 42. Edge 50 is disposed generally parallel to edge 44 and is longer than edge 48. Similarly, the right hand end of edge 44 meets a relatively short inclined edge portion 52 which, in turn, meets another relatively short edge portion 54, leading to the other end of curved edge 42. Edge 54 is disposed at an acute angle to edge 44 and is longer than edge 52. Plate 36 is identical to plate 34 in size and peripheral outline, the two plates being in registry or in alignment when pressed together.

A strip or band of electrical insulating material 60 is placed on and extends along edge 44 and the edge portions 48 and 50. Insulator 60 serves to insulate anode 30 from the metal lid 24 of casing 12 in a completed or assembled cell. Insulator 60 can be relatively thin and may have a width larger than the width of the anode as shown in FIG. 3. An anode lead (not shown) extends from the anode current collector 38 through an insulator and seal structure 66 and becomes the terminal lead 26 which extends through lid 24. For a more detailed description of an illustrated form of insulator and seal structure 66, reference may be made to the above-identified U.S. Pat. No. 4,401,736.

In accordance with the present invention, the surface of anode 30 in operative contact with the halogen-containing cathode/electrolyte 68 is provided with a covering comprising a non-fabric, continuous and solid film of inert substrate material that has been mechanically perforated to provide for anode ion flow therethrough and coated with organic electron donor or other suitable organic material. The electron donor material can be any organic compound having a double bond or an amino group. The electron donor functions to give the cathode/electrolyte 68 sufficient conductivity for proper cell operation. The continuous film of the present invention is the type that may be produced by an extruding, blow molding or casing process, and in its original, unperforated condition the film substrate is not suitable for providing ion flow therethrough. Mechanically perforating the film is thus critical to the present invention.

In the cell of the present invention, anode body 32 has two oppositely directed operative surfaces which are the exposed surfaces of plates 34,36, and these surfaces are provided with coverings 70 and 72, according to the present invention. Each covering, for example covering 70, comprises a film of inert substrate material preferably in the form of a perforated synthetic polymeric film material. The perforated characteristic of the film material, i.e., allowing a significant flow of air therethrough, is important to insure that the substrate material does not act as a complete barrier to ion flow therethrough. By way of example, in an illustrative cell, the substrate can be of polyester film material, preferably a polyethylene terephthalate material that has been mechanically punched or perforated. The perforated film or substrate is then coated with organic electron donor material. In particular, the film or substrate is coated such as by drawing the film through a solution of organic electron donor material and solvent for a suitable time whereupon it is removed from the solution and allowed to dry. By way of example, in an illustrative cell, a preferred form of the organic electron donor material is polyvinyl pyridine polymer, and in particular poly-2-vinylpyridine (PVP) and more particularly cross-linked poly-2-vinylpyridine. The solvent can be dimethylformamide/tetrahydrofuran (DMF/THF).

The resulting perforated and coated polymeric film or substrate is cut out or otherwise formed to have a peripheral outline or border matching that of the anode plate or element that is intended to be covered. Then the coated film is applied to the operative surface of the anode element by pressing with suitable force to pressure bond the film to the anode plate. One method of pressing a thin film covering to a lithium anode element is described in U.S. Pat. No. 4,359,818 issued Nov. 23, 1982, the disclosure of which is hereby incorporated by reference. In the cell of the present invention, each lithium anode element 34,36 is covered in the same way, and the resulting anode 30 with coverings 70,72 adhered to the relatively flat-oppositely directed anode surfaces is shown in FIGS. 2 and 3.

Applying the coated film by pressure bonding requires only the mechanical energy of pressing, in contrast to some other methods such as hot pressing a preformed sheet of organic material onto the anode surface, often in conjunction with adhesives. This method has energy requirements as well as handling requirements that detract from its usefulness. A further advantage is that the resulting coating of active organic electron donor material is more uniform as compared to a coating which is painted or brushed on the electrode surface or as compared to a coating that is impregnated into an open mesh or open weave fabric material. Furthermore, the present invention enables the thickness of the coating, which affects battery performance and characteristics, to be controlled precisely. A uniform coating thickness on the inert substrate material provides improvements in reducing self-discharge of the cell due to the partial masking of the electrode surface, and in particular the anode surface.

In addition, a significant advantage of the present invention is a covering having a desirable degree of flexibility that is retained under dry room conditions. Such flexibility is important for example, in facilitating handling and pressure bonding of the film to the electrode element to provide proper conformance and adherence to the electrode surface. While this is important even in situations where the anode surfaces are flat as in FIGS. 2 and 3, flexibility becomes particularly important when the preformed film is to be applied to an electrode surface which is not flat but instead has surface formations for the purpose of increasing the available active material surface for operative contact with the other electrode material. This now will be described.

FIGS. 4–6 illustrate an alkali metal-halogen electrochemical cell 80 including a covered anode according to another embodiment of the present invention. In FIGS. 4–6, components of cell 80 which are identical to components of cell 10 in FIGS. 1–3 are identified by the same reference numeral with a prime designation. Thus, the covered anode and other cell components are contained within a casing 12' of metal such as stainless steel including spaced apart side walls 14',16' joined by curved end walls 18',20' and a curved bottom wall 22'.

The open top of casing 12' is closed by a lid 24'. Terminal leads 26',28' extend from lid 24', which lid is of conductive metal and welded to casing 12'.

Electrochemical cell 80 includes an anode, generally designated 90 according to this embodiment of the present invention and comprising an anode body 92 of alkali metal, preferably lithium. The body 92 can comprise a pair of lithium plates 94,96 pressed together and bonded against an anode conductor 38', which is a portion of the anode conductor means of the cell. Conductor 38' thus is sandwiched between plates 94,96 and can be of various forms such as a length of wire, a strand or ribbon or a mesh or screen and of metal such as nickel or nickel/alloy.

In the anode 90 of this embodiment of the present invention, at least one and preferably both of the oppositely directed lithium surfaces of plates 94,96 are shaped to include formations which increase the surface area thereof. The formations are designated 100 and each formation is elongated and has terminations at both ends thereof. The terminations are spaced inwardly a short distance from the peripheral edge of the anode assembly thereby defining a marginal border region between a peripheral edge and the terminations of the formations. The formations 100 are generally mutually parallel and also are generally parallel to the longitudinal axis of leads 26!,28'. The formations 100, which are in the shape of ribs or corrugations, have generally smooth outer surfaces and preferably are generally semicircular in cross-section. In the anode structure shown, the ribs 100 occupy a major portion of the outer surface of each lithium element. The remaining surface portions are generally planar and mutually generally parallel except around conductor 38' where they are curved or outwardly bulged slightly.

The edge or periphery of each anode plate is shown in FIG, 4 and is similar to that of anode plates 34,36 in FIGS. 2 and 3. In particular, each plate, for example, plate 94 shown in FIG. 4, has curved edge 102 extending along a major portion of the periphery or border and having a curvature conforming generally to curvature of casing bottom wall 22'. A relatively straight edge portion 104 also is provided and meets curved edge 102 through step-like portions at each end thereof. In particular, the left-hand end of edge 104 meets a relatively short inclined edge portion 108 which, in turn, meets another relatively short edge portion 110 leading to one end of curved edge 102. Edge 110 is disposed generally parallel to edge 104 and is longer than edge 108. Similarly, the right-hand end of edge 104 meets a relatively short inclined edge portion 112 which, in turn, meets another relatively short edge portion 114 leading to the other end of curved edge 102. Edge 114 is disposed at an acute angle to edge 104 and is longer than edge 112. Plate 96 is identical to plate 94 in size and peripheral outline, the two plates being in registry or alignment when pressed together.

A strip or band of insulating material 60' is placed on and extends along edge 104 and the edge portions 108 and 110. Insulator 60' serves to insulate anode 90 from the metal lid 24' of casing 12' in a completed or assembled cell. An anode lead 26' extends from anode conductor 38' through an insulator and seal structure 66' and through lid 24' to serve as one terminal for providing electrical connection to the cell. Lead 28' provides the other cell terminal.

In accordance with the present invention, the surface of anode 90 in operative contact with the halogen-containing cathode/electrolyte 68' is provided with a covering comprising a non-fabric, continuous and solid film of inert substrate material that has been mechanically perforated to provide for anode ion flow therethrough and coated with organic electron donor material. The continuous film of the present invention is the type that may be produced by an extruding, blow molding or casting process, and in its original, unperforated condition the film substrate is not suitable for providing ion flow therethrough. Mechanically perforating the film is thus critical to the present invention.

In the cell of this embodiment, anode body 92 has two oppositely directed operative surfaces which are the exposed surfaces of plates 94,96 each having the formations 100 and the surfaces are provided with coverings 120 and 122, respectively, according to the present invention. Each covering, for example covering 120, comprises a film of perforated substrate material according to the present invention, preferably in the form of perforated synthetic polymeric material. As in the embodiment of FIGS. 1–3, substrate can be a film of polyester material, preferably a polyethylene terephthalate material that has been mechanically punched or perforated. The perforated film or substrate is coated with organic electron donor material. As in the previous embodiment, the film or substrate is drawn through a solution of the organic material and solvent for a suitable time whereupon it is removed from the solution and dried. The organic electron donor material can be poly-2-vinylpyridine (PVP) and the solvent can be dimethylformamide/tetrahydrofuran (DMF/THF) as in the previous embodiment.

The perforated film of substrate is cut out or otherwise formed to have a peripheral outline matching that of the anode plate or element which is intended to be covered. Then the film is applied to the operative surface of the anode element by pressing with suitable force to pressure bond the film to the anode plate. In pressing the coated film on the anode surface, the film is conformed to the surfaces of the formations 100 as well as to the remaining surface of the anode element. The pressing can be performed in the manner illustrated in U.S. Pat. No. 4,359,919, referenced hereinabove. Each lithium anode element 94,96 is covered in the same way, and the resulting anode 90 with coverings 120, 122 adhered to the oppositely directed surfaces including formations is shown in FIGS. 4 and 5. The electrode covering according to this embodiment of the present invention has all the advantages provided by the covering shown and described in connection with FIGS. 1–3.

Figure 7:
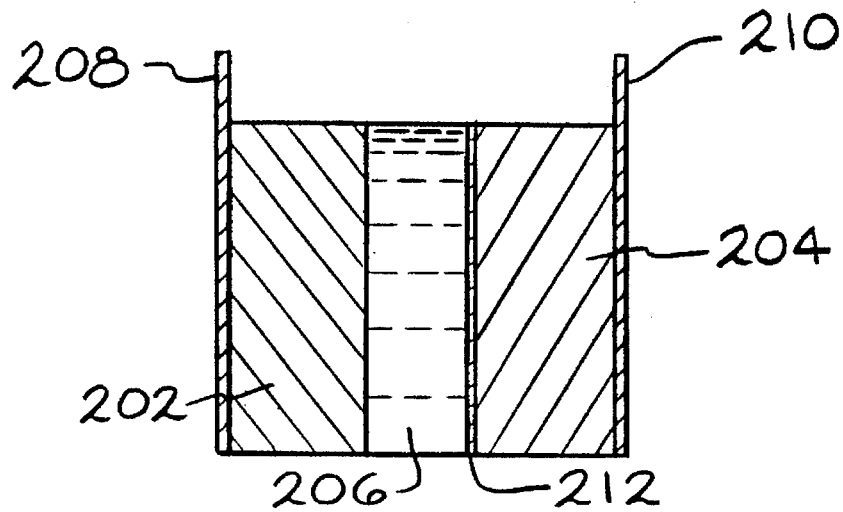
FIG. 7 is a perspective view of an electrochemical cell 200 having a covered cathode according to the present invention.

As shown in FIG. 7, the electrode covering of the present invention can also be used in an electrochemical cell 200 having an anode body 202 of alkali metal, preferably lithium, a cathode matrix 204 and a liquid electrolyte 206. The anode 202 and cathode 204 are provided with respective current collectors 208 and 210. The electrolyte is in operative contact with the electrodes and serves as a medium for migration of ions between the anode 202 and cathode 204 during the electrochemical reactions as is well known to those of skill in the art.

In accordance with the present invention, the surface of cathode 204 in operative contact with the electrolyte 206 is provided with a covering 212 comprising a non-fabric, continuous and solid film of inert substrate material that has been mechanically perforated to provide for anode ion flow therethrough and coated with organic electron donor or other suitable organic material. The electron donor material can be any organic compound having a double bond or an amino group that functions to give the cathode 204 sufficient conductivity for proper cell operation. Thus, the organic electron donor material can be a polyvinyl pyridine polymer, and preferably poly-2-vinylpyridine (PVP) and more preferably cross-linked poly-2-vinylpyridine.

Figure 8:
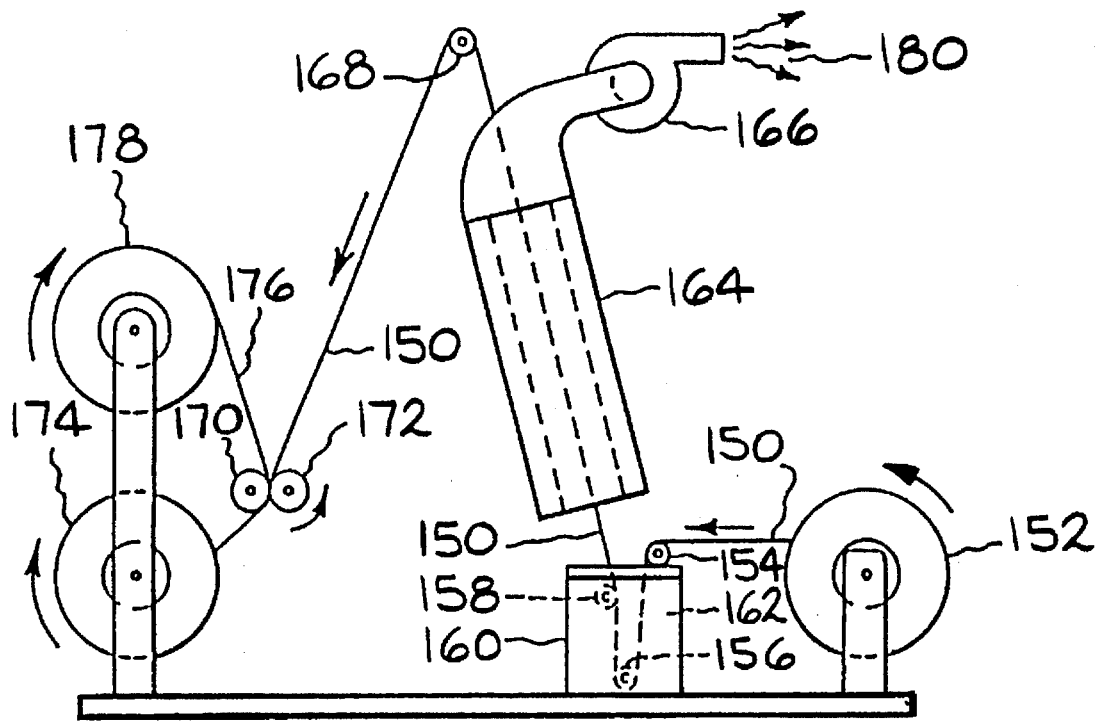
FIG. 8 is a diagrammatic view of the apparatus used in performing the method of the present invention.

FIG. 8 illustrates diagrammatically the apparatus and method for coating the perforated film of substrate material with organic electron donor material according to the present invention. The substrate material, designated 150 in FIG. 8, is in tape form provided with an adequate perforation pattern to insure that the substrate material does not act as a complete barrier to ion flow therethrough. The substrate 150 is withdrawn from a supply reel and guided by rollers 154, 156 and 158 into and out of a vessel or tank 160 containing a solution of an organic electron donor material or other suitable organic coating material 162. The substrate tape 150 leaving container 160 is coated with the liquid and is drawn through a hot air dryer 164 associated with a fan 166 whereupon the tape 150 is guided by an arrangement including a single roller 168 and a pair of rollers 170,172 and wound up on a take-up reel 174. Various drying methods and apparatus can of course be employed. A motor (not shown) drivingly coupled to reel 174 controls the speed of the immersion process and subsequent drying.

A parting sheet 176 wound on a reel 178 is applied to tape 150 by rollers 170,172 for the purpose of preventing tape 150 from sticking together when wound on take-up reel 174. Parting sheet 176 can be of polypropylene material, and the use of parting sheet 176 may not be necessary in all cases depending on the nature of the substrate material and the solvent. The depth of roller 156 below the level of liquid 162 controls the exposure time of tape 150 to the solution of organic material. The thickness of the organic material which coats tape 150 is thereby controlled by roller 158 and the angle over which tape 150 is drawn on roller 158. For example, at one extreme, if tape 150 is drawn along roller 158 in a straight up or vertical direction as viewed in FIG. 8, roller 158 has no effect on the thickness of the organic material coating.

Air currents from dryer 164 are designated 180 in FIG. 8. Upon leaving dryer 164, the tape 150 must be dry enough to avoid sticking to roller 168 but not excessively dry that the tape 150 is brittle and cracks upon travelling through rollers 170,172. Operating dryer 164 at a temperature in the range of between about 50° C. to 150° C., preferably about 85° C., has been found to be satisfactory. The coated substrate material 150 subsequently can be withdrawn from reel 174 and cut to desired shapes for pressing onto electrode components, such as the lithium anodes described in FIGS. 1 to 6 and the cathode described in FIG. 7. For a more detailed method and apparatus for coating the thin film of substrate material 150 with organic electron donor material according to the present invention, reference may be made to the above identified U.S. Pat. No. 4,812,376.

The following examples further illustrate the covered anode of the present invention employed in an alkali metaloxyhalide electrochemical cell:

EXAMPLE I

Samples were cut from a 1 mil commercially available polyethylene terephthalate (PET) film material to provide circular samples having an area of 1.0 square inch. Thirtyseven samples were obtained and weighed to determine the weight distribution. The mean weight density was determined to be 12.9 mg/square inch, with a standard deviation of 0.20 mg/square inch. For comparison purposes, seventy-five similarly sized samples of Hollyrex #3251 were weighed and determined to have a mean weight of 13.0 mg/square inch, with a standard deviation of 2.4 mg/square inch. PET thus has approximately the same weight as the similarly sized Hollyrex with a standard deviation on the order of a magnitude less.

EXAMPLE II

One hundred feet of commercially available 1 mil PET tape having a perforated pattern designated 051-0068 by Perforating Industries, Inc., which is a 50% open staggered 60° hole pattern of web thickness (centers-diameter)= 0.068"–0.051"=0.017", was used in this example. The thusly perforated tape was coated using a technique similar to that described with respect to FIG. 8 by drawing through a 18.6% concentration of PVP in a THF solvent solution, followed by air drying. Thirty-five anode blanks were cut from the coated tape and determined to weigh an average of 17.3 mg/blank with a standard deviation of 0.5 The range in weights was slightly less (approx. 0.2 mg/blank) than that observed for similar weight density Hollytex blanks, however, the amount of PVP coating/blank was observed to be more uniform. The range in observed weights for the blanks was believed to occur partially because of the ragged edges obtained at the tear tab because PET film is much stronger than Hollytex fabric, and thus it is more difficult to obtain a clean tear. The weight of PVP was determined to be about 21.6 mg/pair of blanks.

Twelve (12) alkali metal-oxyhalide, liquid electrolyte test cells, indicated as cell Nos. 1865 to 1876, where fabricated with the PVP coated perforated PET substrate pressed onto the lithium anode surface. The twelve test cells then were subjected to a 35 day burn-in test. The results of the mean and standard deviations of the voltages and the DC resistances at 1000 Hz are indicated in Table I.

TABLE I

| Serial Number | Voltage millivolts Day 35 | Rdc @ 1000 Hz ohms Day 35 |
|---|---|---|
| 1865 | 2780 | 106 |
| 1866 | 2779 | 103 |
| 1867 | 2779 | 101 |
| 1868 | 2780 | 93 |
| 1869 | 2780 | 84 |
| 1870 | 2777 | 95 |
| 1871 | 2778 | 90 |
| 1872 | 2779 | 96 |
| 1873 | 2779 | 101 |
| 1874 | 2778 | 94 |
| 1875 | 2779 | 117 |
| 1876 | 2778 | 98 |
| mean | 2778.8 | 98.2 |
| st dev | 0.9 | 8.4 |

Two of the cells, indicated as cell No. 1875 (highest impedance) and No. 1873 (close to average impedance) were subjected to destructive analysis. There were no observable differences between the two cells. The PET substrate remained intact and was able to be peeled away from the anode with the PVP remaining on the lithium anode. The lithium anode appeared the same under the PET substrate and in the perforated areas.

EXAMPLE III

Perforated PET film according to the present invention was coated with a 23.0% concentration of PVP in a THF solvent solution, followed by air drying to provide a coated substrate having a PVP weight of about 46.0 mg per pair of blanks. Twelve (12) alkali metal-oxyhalide, liquid electrolyte test cells, indicated as Cell Nos. 2247 to 2258, were fabricated in a manner similar to that as described in EXAMPLE II. The substrate readily pressed onto the lithium anode, the test cells were then subjected to a 35 day burn-in test. The results of this test are indicated in Table II. This table also shows a burn-in test for twelve (12) standard production alkali metal/oxyhalide, liquid electrolyte test cells routinely selected for testing. The latter cells were fabricated using a PVP impregnated Hollyrex fabric pressed onto the lithium anode.

TABLE II

| PVP Coated Perforated PET Serial Number | Voltage millivolts Day 35 | Rdc @1000 Hz ohms Day 35 |
|---|---|---|
| 2247 | 2780 | 59 |
| 2248 | 2780 | 58 |
| 2249 | 2779 | 54 |
| 2250 | 2779 | 55 |
| 2251 | 2780 | 57 |
| 2252 | 2780 | 57 |
| 2253 | 2780 | 56 |
| 2254 | 2779 | 54 |
| 2255 | 2779 | 57 |
| 2256 | 2780 | 58 |
| 2257 | 2779 | 56 |
| 2258 | 2778 | 64 |
| mean | 2779.4 | 57.1 |
| st.dev. | 0.7 | 2.7 |
| PVP Impregnated Hollytex Fabric Serial Number | Voltage millivolts Day 35 | Rdc @1000 Hz ohms Day 35 |
| 66247 | 2779 | 63 |
| 66678 | 2779 | 53 |
| 66729 | 2779 | 56 |
| 66829 | 2777 | 65 |
| 66869 | 2777 | 61 |
| 66911 | 2776 | 69 |
| 66955 | 2776 | 61 |
| 66996 | 2776 | 63 |
| 67065 | 2777 | 69 |
| 67108 | 2779 | 68 |
| 67153 | 2777 | 61 |
| 67205 | 2777 | 57 |
| mean | 2777.4 | 62.2 |
| st. dev. | 1.2 | 5.1 |

Those cells having the electrode covering applied to the anode according to the present invention have standard deviations for voltages and DC resistance at 1000 Hz that are roughly half of the corresponding prior art values. In addition, the electrode covering made according to the present invention has a more uniform cross-sectional thickness than those made according to the prior art. Thus, electrochemical cells having the present electrode covering have voltages that are higher on average by 2.0 millivolts and DC resistances at 1000 Hz that are lower on average by more than 5 ohms than previously known anode coatings.

It is therefore apparent that the present invention accomplishes its intended objects. While embodiments of the present invention have been described in detail, that is for the purpose of illustration, not limitation.

What is claimed is:

1. A method of covering an operative surface of an anode for an electrochemical cell containing an alkali metal anode, comprising the steps of:
   a) providing a non-fabric, continuous film of anode ion impermeable substrate material having a uniform unit weight;
   b) perforating the film with a pattern of openings, each opening having a shape to provide for anode ion flow therethrough;
   c) coating the film with an organic election donor material; and
   d) applying the coated film to the anode operative surface.

2. The method of claim 1 including providing the substrate material as a flexible material.

3. The method of claim 1 including providing the substrate material as a synthetic material.

4. The method of claim 1 including providing the substrate material as a polyester material.

5. The method of claim 4 including providing the polyester material as polyethylene terephthalate.

6. The method of claim 1 including providing the organic election donor material comprising poly-2-vinylpyridine.

7. The method of claim 1 including providing the anode of lithium.

8. The method of claim 1 wherein the step of coating the film of perforated substrate material includes dipping the film into a solution of the organic material and solvent, removing the film from the solution, and drying the film.

9. The method of claim 1 wherein the step of applying the coated film to the anode operative surface is done by pressing.

10. The method of claim 1 including providing the pattern of openings with a sufficient density to provide the continuous film with about a 50% open area.

11. A method of covering an interface of an electrode and an electrolyte in an electrochemical cell, comprising the steps of:
   a) providing the electrochemical cell comprising an anode electrode and a cathode electrode and the operatively associated electrolyte;
   b) providing a non-fabric, continuous film of electrode ion impermeable substrate material having a uniform unit weight;
   c) perforating the film with a pattern of openings, each opening having a shape to provide for electrode ion flow therethrough;
   d) coating the film with an organic election donor material; and
   e) applying the coated film to one or more of the interfaces of the electrodes.

12. The method of claim 11 including providing the electrochemical cell as an alkali metal-halogen couple with a solid electrolyte and applying the coated film on an anode surface in contact with the solid electrolyte.

13. The method of claim 12 including providing the alkali metal as lithium and applying the coated film on a lithium surface in contact with the solid electrolyte.

14. The method of claim 11 including providing the electrochemical cell as an alkali metal-oxyhalide couple with a liquid cathode/electrolyte and applying the coated film on an anode surface in contact with the liquid cathode/electrolyte.

15. The method of claim 14 including providing the alkali metal as lithium and applying the coated film on a lithium surface in contact with the liquid cathode/electrolyte.

16. The method of claim 11 including providing the substrate material as a flexible material.

17. The method of claim 11 including providing the substrate material as a synthetic material.

18. The method of claim 11 including providing the substrate material as a polyester material.

19. The method of claim 18 including providing the polyester material as a polyethylene terephthalate film.

20. The method of claim 11 including providing the organic election donor material comprising poly-2-vinylpyridine.

21. The method of claim 11 including pressure-bonding the covering to the electrode surface.

22. The method of claim 11 wherein the electrode surface is relatively flat and adhering the covering to the surface.

23. The method of claim 11 wherein the electrode surface is provided with formations to increase the surface area thereof and adhering the covering to the surface.

24. The method of claim 11 further including providing the cathode comprising a charge transfer complex formed from iodine and poly-2-vinylpyridine.

25. The method of claim 11 including providing the covering in the form of a unitary body.

26. The method of claim 11 including providing the pattern of openings with a sufficient density to provide the continuous film with about a 50% open area.

27. A method of covering an anode surface for an anode incorporated into an alkali-metal electrochemical cell, comprising the steps of:
   a) providing an anode body of alkali metal having a surface for operative contact with an electrolyte;
   b) associating an anode electrical conductor with the anode body;
   c) providing a non-fabric, continuous film of anode ion impermeable substrate material having a uniform unit weight;
   d) perforating the film with a pattern of openings, each opening having a shape to provide for anode ion flow therethrough;
   e) coating the film with an organic election donor material; and
   f) applying the coated film to the anode operative surface.

28. The method of claim 27 including providing the alkali metal as lithium.

29. The method of claim 27 including providing the substrate material as a synthetic material.

30. The method of claim 27 including providing the substrate material as a polyester material.

31. The method of claim 30 including providing the polyester material as a polyethylene terephthalate film.

32. The method of claim 27 including providing the organic electron donor material comprising poly-2-vinylpyridine.

33. The method of claim 27 including pressure-bonding the covering to the anode surface.

34. The method of claim 27 wherein the anode surface is relatively flat and adhering the covering to the surface.

35. The method of claim 27 wherein the anode surface is provided with formations to increase the surface area thereof and adhering the covering to the surface.

36. The method of claim 27 including providing the covering in the form of a unitary body.

37. The method of claim 27 including providing the pattern of openings with a sufficient density to provide the continuous film with about a 50% open area.

* * * * *